E. BENSON.
SCREEN ATTACHMENT FOR CAMERAS.
APPLICATION FILED FEB. 11, 1920.
1,438,013.
Patented Dec. 5, 1922.
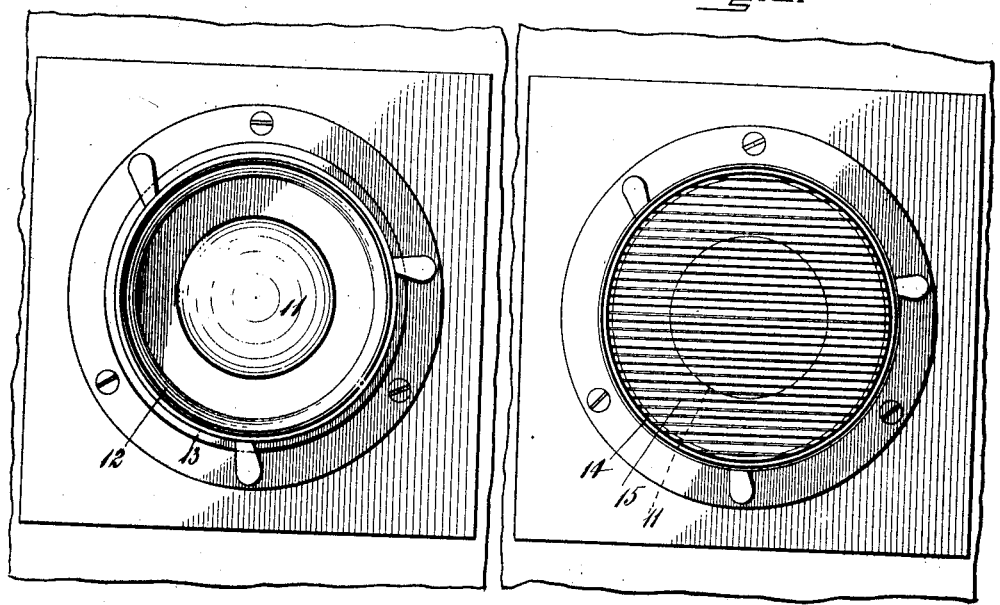
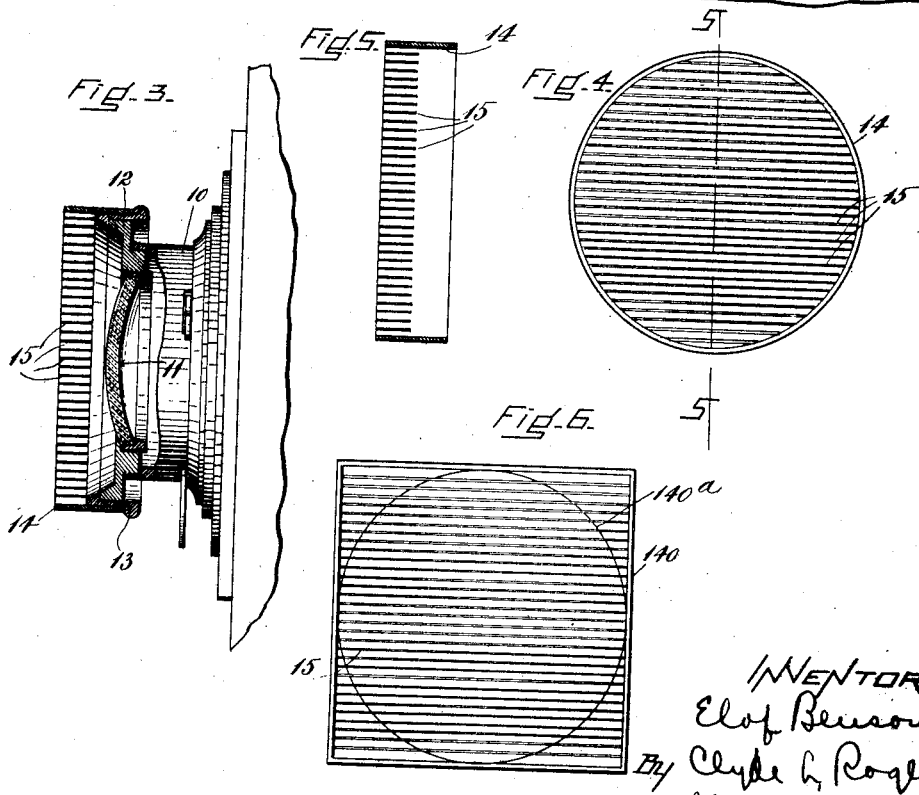

Patented Dec. 5, 1922.

1,438,013

UNITED STATES PATENT OFFICE.

ELOF BENSON, OF NEWTON, MASSACHUSETTS, ASSIGNOR OF ONE-HALF TO FRED M. DURKEE, OF BROOKLINE, MASSACHUSETTS.

SCREEN ATTACHMENT FOR CAMERAS.

Application filed February 11, 1920. Serial No. 357,966.

*To all whom it may concern:*

Be it known that I, ELOF BENSON, a citizen of the United States, and resident of Newton, county of Middlesex, Commonwealth of Massachusetts, have invented an Improvement in Screen Attachments for Cameras, of which the following description, in connection with the accompanying drawings, is a specification, like characters on the drawings representing like parts in each of the several views.

This invention relates to a screen device or attachment for use with lenses of cameras, and more particularly to a multiple screen composed of a series of screen vanes so arranged as not to cut off any of the light required to produce the image, but to effectually cut off divergent rays that would otherwise more or less diffuse or blur the image. The invention is adapted for cameras of all kinds including amateur, commercial and studio work and also motion picture cameras. In its preferred embodiment the invention comprises a series of thin vanes set close to the lens and approximately in parallelism. In a further preferred embodiment these vanes are so mounted that they may be adjusted angularly with reference to the direction from which the disturbing light emanates, and they are also preferably, though not necessarily mounted directly in front of the camera lens. The foregoing and other objects and advantages of the invention will more fully appear from the following detailed description and the distinctive features of novelty will be thereafter pointed out in the appended claims.

Referring to the drawings:

Fig. 1 is a partial front elevation of a camera adapted to receive the screen device of the invention;

Fig. 2 is a similar partial elevation showing the screen device of the invention attached to the camera;

Fig. 3 is a view partly in side elevation and partly in vertical section of the lens mounting of the camera with my improved screen device attached thereto, the screen device being shown in section;

Fig. 4 is a front view of the screen device detached;

Fig. 5 is a longitudinal section thereof on line 5—5 of Fig. 4; and

Fig. 6 is a front view showing a modified form of the screen device.

10 indicates a usual or suitable cylindrical mounting for a camera lens 11 which may be of any ordinary or suitable type. The holding ring 12 of this lens has fitted thereon a flanged collar 13, the outer surface of which constitutes a mounting for a ring or collar 14 which constitutes the housing of the screen device of my invention. In this ring collar 14 is fixed a series of vanes 15. These vanes are of thin material, preferably metal and they are also preferably dead black, or substantially non-reflecting so as to absorb completely and without reflection all stray light coming toward the lens,—that is, not from the object whose image is to be taken. These vanes are arranged relatively close together, preferably about one sixteenth inch apart and they are preferably about one quarter inch in depth or width, though these precise dimensions may be varied. The vanes 15 are shown as arranged in parallelism and while this is a preferred arrangement and disposition thereof, this showing is to be understood as merely illustrative in a broader aspect and intended to typify any suitable multiple or series arrangement of screen vanes adapted for the purpose stated. As shown the vanes are disposed close up to, and in front of, the lens and while this is the preferred arrangement, they might also be arranged back of the lens instead, it being however a prime requisite in either case that they be relatively close to the lens so as not to interfere with the image. The ring collar 14 may be turned angularly on the sleeve 13 so that the system of vanes may be set at any required angle according to the direction from which the disturbing or divergent light emanates, i. e., so that the vanes will be transverse to the direction of such disturbing light. As herein shown the system of vanes is stationary with respect to the lens except for this angular adjustment, but this is also merely a typical and illustrative arrangement, since within the contemplation of the invention a system of vanes movable in operation either by rotation or otherwise might be provided. In Fig. 5 I show a form of the invention wherein the vane housing 140 is rectangular instead of circular. This may for some uses be preferred, and in such case the rectangular housing portion 140 may have a circular ring portion 140ª at one end thereof for fitting on the sleeve 13 in the manner already described. The invention is however not to be understood as limited to either a circular or a rectangular, or any other particular shape of the vane housing. In general the present embodiment is therefore to be understood in all respects as illustrative and not restrictive, reference being had to the appended claims rather than to the foregoing description to indicate the scope of the invention.

Having described my invention, what I claim as new and desire to secure by Letters Patent is:

1. A camera equipped with a system of screen vanes mounted relatively close to the lens as compared with the widthwise dimension of said vanes and adapted to cut off stray or divergent light without interfering with the production of the image from the object to be photographed.

2. A camera equipped with a system of screen vanes mounted relatively close to the lens as compared with the widthwise dimension of said vanes and adapted to cut off stray or divergent light without interfering with the production of the image from the object to be photographed, the mounting of said vanes permitting angular adjustment thereof according to the direction from which disturbing light emanates.

3. A camera equipped with a system of non-reflecting and light absorbing vanes mounted relatively close to the lens as compared with the widthwise dimension of said vanes, and arranged and adapted to cut off divergent or stray light from the lens without interfering with the production of the image of the object to be photographed.

4. A camera equipped with a system of screen vanes relatively thin and close together as compared with the widthwise dimension thereof and adapted to cut off stray or divergent light from the lens.

5. A camera equipped with a system of vanes relatively thin and close together as compared with the widthwise dimensions thereof in substantial parallelism, and mounted for angular adjustment so as to cut off stray or divergent light from whatever angle it may emanate without interfering with the production of the image.

In testimony whereof, I have signed my name to this specification.

ELOF BENSON.